2,997,455
PROCESS OF STABILIZING POLYOLEFINS, AND PRODUCT

Franz Broich, Hans Steinbrink, Albert Frese, and Helmut König, all of Marl, Germany, assignors to Chemische Werke Huls Aktiengesellschaft, Marl, Germany, a corporation of Germany
No Drawing. Filed Oct. 25, 1957, Ser. No. 692,279
Claims priority, application Germany Nov. 9, 1956
8 Claims. (Cl. 260—45.9)

Polyolefins, such as are accessible for example by the so-called high-pressure polymerization or by the so-called low-pressure polymerization, are decomposed by the action of light, air, and heat. It is known that this decomposition can be prevented by adding stabilizers, such as sulfur, thiuram, dithiocarbamates, diphenylamine, alkyl phenols, and condensation products of two molecules of alkyl phenols with one molecule of formaldehyde. However, these stabilizers generally possess a certain inherent color by which the polyolefins are discolored.

It has been found that polyolefins can be stabilized more advantageously by adding to them 0.01–1% of a condensation product of a phenol, formaldehyde, and a secondary amine, said condensation product having the configuration

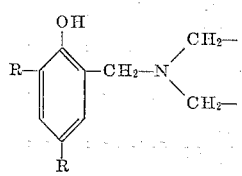

in which each R stands for a member of the group consisting of hydrogen and alkyl groups containing from 1 to 8 carbon atoms and

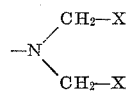

stands for a member of the group consisting of the di-lower alkylamines, morpholine, piperazine and piperidine residues.

As phenols there may be used phenols substituted in ortho or para position with alkyl residues containing 1–8 carbon atoms, for example o- and p-methyl, -ethyl, -propyl, -butyl, -hexyl and octyl phenols as well as the corresponding 2,4-dialkyl phenols. In the dialkyl phenols the two alkyl residues may be the same or different. Particular advantages are offered by alkyl phenols having at least one highly branched alkyl residue, such as a tertiary butyl residue. As secondary amines the highly basic amines, such as dimethylamine, diethylamine, di-n-propylamine, diisopropylamine, methylethylamine, etc., may be used. It may also be advantageous to select cyclic secondary amines, such as morpholine, piperazine, and piperidine. In the case of piperazine the condensation of the two secondary amino groups occurs in such a way that then the above described configuration is present twice in the same molecule. The condensation of the phenols with formaldehyde and with secondary amines is effected in a known manner, for example, formaldehyde, preferably in aqueous solution, is added to a solution of the phenol and then, advantageously while cooling and stirring, the secondary amine, if desired in solution, is introduced and allowed to react, and the condensation product which separates after subsequent prolonged heating is removed.

With these condensation products it is possible effectively to stabilize the polyethylene obtained by high-pressure polymerization as well as the polyethylene, polypropylene, and polybutylene obtained by low-pressure polymerization. The condensation products are added in amounts of 0.01–1%, preferably 0.05–0.5%. In contrast to the known stabilizers for polyolefins, they cause no discoloration. Surprisingly, they improve also the transparency of the polyolefins, which generally is poor because of the high proportion of crystalline component. This improvement of the transparency is particularly favorable in the low-pressure polyolefins, whose crystalline components are greater than those of the high-pressure olefins. Another advantage in the stabilization of the low-pressure polyolefins is the ability of the condensation products to bind the last traces of the acid catalyst. The actual stabilizing effect of the condensation products is generally equivalent, or even superior, to that of the known stabilizers. Thus, their efficiency is higher, for example, than the total effect of mixtures of diphenylamine, already known as a stabilizer, and alkyl phenols.

Example 1

2000 parts by weight of low-pressure polyethylene ($\eta_{red}$ 2.3) are mixed with 1 part by weight of the condensation product from 2-tert.-butyl-4-methyl phenol, piperidine, and formaldehyde. After fabrication in an injection molding machine one obtains a polyethylene which is very transparent and shows a favorable aging stability during hot storage in a circulating-air drying cabinet at 100° C. for up to 40 days. To test the transparency the extinction was determined. At a wave length of 400–800 millimicrons it is for 1 mm. layer thickness 16–24. Unstabilized polyethylene samples, under the same conditions, give an extinction value of 42–50.

Example 2

2000 parts by weight of low-pressure polyethylene ($\eta_{red}$ 3.3) are mixed with 2 parts by weight of the condensation product from 2-tert.-butyl-4-methyl phenol, morpholine, and formaldehyde. After fabrication as injection-molded parts and tubes one obtains transparent shaped parts which exhibit a favorable aging stability during hot storage in the circulating-air drying cabinet at 100° C. for 40 days.

2000 parts by weight of low-pressure polyethyene ($\eta_{red}$ 3.3) stabilized with 2 parts by weight of a mixture of 2,6-di-tert.-butyl-4-methyl phenol and morpholine, gave injection-molded parts and tubes, produced under equal conditions, having an aging stability of only 12 days. When using five times the amount of the stabilizer mixture, the aging stability increases to only 14 days.

Example 3

2000 parts by weight of low-pressure polypropylene ($\eta_{red}$ 3.5) are mixed with 2 parts by weight of the condensation product from 2 molecules each of 2-tert.-butyl-4-methyl phenol and formaldehyde with one molecule of piperazine. After fabrication as injection-molded parts, tubes and sheets, the shaped parts have an aging stability of more than 40 days in hot storage at 100° C. in a circulating-air drying cabinet.

Example 4

2000 parts by weight of low-pressure polybutylene ($\eta_{red}$ 4.5) are mixed with 2 parts by weight of the condensation product from octyl phenol (p-(1-methyl-1-tert.-butyl-propyl)-phenol), dimethylamine and formaldehyde. After fabrication as injection-molded parts, tubes and sheets, the shaped parts have an aging stability of more than 40 days in hot storage at 100° C. in a circulating-air drying cabinet.

In the following table the strengths of polyethylene stabilized with various condensation products are compiled as a function of time during hot storage in a circulating-air drying cabinet. As the measure of strength the force required to tear ring-shaped samples 5 mm. wide of tubes having an outside diameter of 32 mm. and a wall thickness of 2.9 mm. made of low-pressure polyethylene ($\eta_{red}$ 2.0–2.3) is used as the unit.

| Stabilizer | 0 days, kg. | 4 days, kg. | 10 days, kg. | 20 days, kg. | 40 days, kg. |
|---|---|---|---|---|---|
| not stabilized | 44 | 20 | 3 | 2 | 1 |
| 0.5% cond. prod. of 2-tert.-butyl-4-methyl phenol morpholine formaldehyde | 45 | 52 | 53 | 54 | 59 |
| 0.05% cond. prod. of 2-tert.-butyl-4-methyl phenol morpholine formaldehyde | 46 | 55 | 53 | 54 | 58 |
| 0.5% cond. prod. of 2-tert.-butyl-4-methyl phenol piperidine formaldehyde | 44 | 49 | 48 | 46 | 47 |
| 0.05% cond. prod. of 2-tert.-butyl-4-methyl phenol piperidine formaldehyde | 44 | 48 | 47 | 46 | 48 |
| 0.05% cond. prod. of p-octyl phenol dimethylamine formaldehyde | 44 | 47 | 50 | 50 | 50 |

We claim:
1. Process for the stabilization of a polyolefin of the group consisting of polyethylenes, polypropylenes and polybutylenes which comprises adding thereto from 0.01% to 1% by weight of a condensation product of a phenol of the group consisting of the o- and p-alkyl phenols and the 2,4-dialkylphenols in which the alkyl groups contain from 1 to 8 carbon atoms, formaldehyde and a secondary amine of the group consisting of the di-lower alkyl amines, morpholine, piperazine and piperidine, said condensation product having the formula

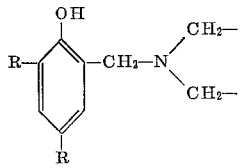

in which R stands for a member of the group consisting of hydrogen and alkyl groups containing from 1 to 8 carbon atoms, at least one R standing for said alkyl groups, and

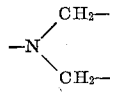

stands for a monovalent residue of a member of the group consisting of di-lower alkyl amines, morpholine, piperazine and piperidine.

2. Process as defined in claim 1 in which the amine is morpholine.

3. A composition of matter comprising a polyolefin of the group consisting of polyethylenes, polypropylenes and polybutylenes and from 0.01% to 1% by weight of a condensation product of a phenol of the group consisting of the o- and p-alkyl phenols and the 2,4-dialkylphenols in which the alkyl groups contain from 1 to 8 carbon atoms, formaldehyde and a secondary amine of the group consisting of the di-lower alkyl amines, morpholine, piperazine and piperidine, said condensation product having the formula

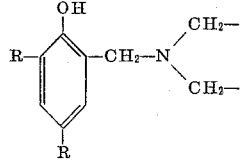

in which R stands for a member of the group consisting of hydrogen and alkyl groups containing from 1 to 8 carbon atoms, at least one R standing for said alkyl groups, and

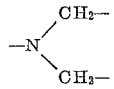

stands for a monovalent residue of a member of the group consisting of the di-lower alkyl amines, morpholine, piperazine and piperidine.

4. A composition as defined in claim 3 in which the amine is morpholine.
5. A composition as defined in claim 3 in which the amine is piperazine.
6. A composition as defined in claim 3 in which the amine is piperidine.
7. A composition as defined in claim 3 in which the amine is dimethylamine.
8. A composition as defined in claim 3 in which the phenol is 2-tert-butyl-4-methyl phenol.

References Cited in the file of this patent

UNITED STATES PATENTS

| 1,899,426 | Scott | Feb. 28, 1933 |
| 2,511,063 | Ingram | June 13, 1950 |

FOREIGN PATENTS

| 375,360 | Great Britain | June 24, 1932 |
| 571,943 | Great Britain | Sept. 17, 1945 |
| 771,022 | Great Britain | Mar. 27, 1957 |